(12) United States Patent
Strom et al.

(10) Patent No.: US 7,369,348 B2
(45) Date of Patent: May 6, 2008

(54) METHOD AND APPARATUS FOR ADAPTATION TO HUMIDITY IN A HARD DISK DRIVE

(75) Inventors: Brian D. Strom, Cupertino, CA (US); SungChang Lee, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/446,573

(22) Filed: Jun. 2, 2006

(65) Prior Publication Data

US 2007/0279795 A1 Dec. 6, 2007

(51) Int. Cl.
*G11B 21/02* (2006.01)
(52) U.S. Cl. ........................................................ 360/75
(58) Field of Classification Search ................. 360/69, 360/75, 31, 59, 128, 236.5; 369/13.02; 29/603.07
See application file for complete search history.

(56) References Cited

U.S. PATENT DOCUMENTS

| | | | | |
|---|---|---|---|---|
| 5,939,170 A | * | 8/1999 | Nishimori et al. | 428/141 |
| 6,011,666 A | * | 1/2000 | Wakamatsu | 360/69 |
| 6,671,232 B1 | * | 12/2003 | Stupp | 369/13.02 |
| 6,771,440 B2 | * | 8/2004 | Smith | 360/31 |
| 6,822,819 B1 | * | 11/2004 | Gillis et al. | 360/59 |
| 6,831,802 B1 | * | 12/2004 | Gillis et al. | 360/75 |
| 6,914,739 B2 | * | 7/2005 | Feliss et al. | 360/69 |
| 6,954,327 B2 | * | 10/2005 | Gillis et al. | 360/75 |
| 2003/0074784 A1 | * | 4/2003 | Konishi et al. | 29/603.07 |
| 2006/0023354 A1 | * | 2/2006 | Stipe | 360/128 |
| 2006/0092570 A1 | * | 5/2006 | Payne et al. | 360/236.5 |

* cited by examiner

*Primary Examiner*—Fred F. Tzeng
(74) *Attorney, Agent, or Firm*—Earle Jennings; GSS Law Group

(57) ABSTRACT

Hard Disk Drive (HDD) including a humidity sensor. Humidity sensor communicating with embedded circuit to provide humidity reading to alter flying height control asserted to control vertical positioning of slider above disk surface. Method operating HDD using humidity sensor and apparatus implementing method. Methods of manufacturing embedded circuit and HDD, and their products.

24 Claims, 11 Drawing Sheets

METHOD AND APPARATUS FOR ADAPTATION TO HUMIDITY IN A HARD DISK DRIVE

TECHNICAL FIELD

This invention relates to hard disk drives, in particular, to apparatus and methods for measuring humidity and adapting the operation of the hard disk drive based upon the humidity measurement.

BACKGROUND OF THE INVENTION

Contemporary hard disk drives include a head stack assembly pivoting through an actuator pivot to position one or more read-write heads, embedded in sliders, each over a disk surface. The data stored on the disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known as track following. It is during track following mode that the read-write head is used to access the data stored of the track. Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon. Recently, vertical micro-actuators have begun to be used to create what is sometimes referred to as flying height on demand.

What is perpetually needed are mechanisms and methods supporting increased reliability in accessing the tracks on the rotating disk surface of a hard disk drive. Toward that end, it has been understood for some time that the ambient air temperature affects the operations of a hard disk drive. To the inventors' knowledge, no one has previously recognized the significance of humidity on these operations. This invention begins by recognizing a problem where no one previously knew one existed, and then solving that problem.

SUMMARY OF THE INVENTION

The invention involves recognizing that the air gap between a slider and the rotating disk surface accessed by the slider tends to change in response to humidity changes within the hard disk drive. The inventors have experimentally found that even at moderate temperatures, for example forty five degrees Centigrade (° C.), if the relative humidity is high, say 90%, then enough water is present to reduce the magnetic spacing by more than one nanometer (nm), where the optimal flying height was under ten run. In further experiments, a contemporary hard disk drive was modified to measure relative humidity and provide an estimate of the vertical position of a slider over the rotating disk surface. When the temperature was kept at 53° C. and the humidity changed from 6% to 64%, the vertical position of a slider changed by about 2 nm. The inventors in discovering this realized that including a humidity sensor in a hard disk drive brought the advantage of being able to compensate for humidity change.

Preferably, the hard disk drive includes the humidity sensor communicatively coupled to an embedded circuit providing a humidity reading used to control the vertical position of at least one slider accessing a rotating disk surface.

The invention operates a hard disk drive with its humidity sensor as follows. A humidity reading received from the humidity sensor is used to create a humidity estimate. A flying height control is determined based upon the humidity estimate. The flying height control is asserted to a vertical micro-actuator coupled to the slider to alter the vertical position of the slider over the rotating disk surface.

The flying height control may further be determined based upon the track the slider is following on the rotating disk surface. The tracks of the rotating disk surface may preferably be organized into track groups of consecutive tracks, and the flying height control may preferably be determined based upon the track group the track belongs to.

The flying height control may further be determined based upon the humidity estimate and a temperature estimate. The temperature estimate may preferably account for change in the media coercivity as well as change in the vertical position. By way of example, decreases in the temperature estimate at the same humidity estimate may alter the flying height control to lower the vertical position, due to at least one and preferably both the media coercivity and the vertical position.

The embedded circuit may support the invention's operations in the hard disk drive by including the following. Means for receiving the humidity reading from the humidity sensor to create the humidity estimate. Means for determining the flying height control based upon the humidity estimate. And means for asserting the flying height control to the vertical micro-actuator coupled to the slider to alter the vertical position of the slider over the rotating disk surface. As used herein, the means group will consist of the means mentioned in this paragraph.

At least one of the means group may preferably be implemented by at least one instance of at least one of the following. An embedded computer accessibly coupled to an embedded memory and directed by an embedded program system including at least one program step residing in the embedded memory and implementing the member of the means group. A servo computer accessibly coupled to a servo memory and directed by a servo program system including at least one program step residing in the servo memory and implementing the member of the means group. A finite state machine implementing the member of the means group. A neural network implementing the member of the means group. And an inference engine implementing the member of the means group.

The means for receiving may further include an Analog to Digital Converter (ADC), an analog interface to the ADC, and/or a serial interface to the humidity sensor. The means for asserting may further include a Digital to Analog Converter (DAC) receiving the flying height control to create a DAC output used to at least partly create the vertical control signal, an amplifier receiving the DAC output to create an amplified output used to further create the vertical control signal, and/or a filter of at least one the DAC output and the amplified output to further create the vertical control signal.

In certain embodiments, the embedded computer directed by the embedded program system may at least partly implement each member of the means group. The embedded program system may preferably include each of the following program steps. Receiving the humidity reading from the humidity sensor to create the humidity estimate. Determining the flying height control based upon the humidity estimate. And asserting the flying height control to the vertical micro-actuator coupled to the slider to alter the vertical position of the slider over the rotating disk surface.

Alternatively, the servo computer directed by the servo program system may at least partly implement each of the members of the means group. The servo program system may preferably include each of the program steps discussed for the embedded program system above.

Alternatively, the finite state machine may at least partly implement each member of the means group. The finite state machine may be implemented using a Application Specific Integrated Circuit (ASIC) and/or a Programmable Logic Device (PLD). As used herein, the ASIC may include a standard cell integrated circuit, a mixed signal integrated circuit and/or a gate array. The PLD may include a Field Programmable Gate Array, a Programmable Logic Array, or a network including one or more instances of these elements.

Alternatively, the neural network may at least partly implement each member of the means group. The neural network may include a digital logic neural network and/or an analog neural network.

Alternatively, the inferential engine may at least partly implement each member of the means group. The inferential engine may include a fuzzy logic controller and/or an inference processor receiving the humidity reading to determine the flying height control through inference based upon the humidity reading.

Manufacturing the embedded circuit may preferably provide a communicative coupling for the embedded circuit to receive the humidity reading from the humidity sensor. The embedded circuit is a product of this manufacturing process. Manufacturing may further include programming the embedded program system, the servo program system, the finite state machine, the neural network and/or the inferential engine to support the operations of the invention. Programming the embedded program system may preferably include programming a non-volatile memory component of the embedded memory. Similarly, programming the servo program system may preferably include programming a non-volatile memory component of the servo memory.

Returning to the hard disk drive, the vertical micro-actuator may include a vertical micro-actuator element embedded in the slider and/or a micro-actuator assembly coupled to the slider. The micro-actuator assembly may employ a piezoelectric effect and/or an electrostatic effect. The slider may include a spin valve or a tunnel valve.

The humidity sensor may preferably measure at least one of the properties of a resistance, a capacitive and/or a thermal conductance. These measures are taken for materials possessing the property as a function of water pressure. The disk base and the disk cover may preferably enclose the humidity sensor.

The hard disk drive preferably includes the disk base coupled to a disk cover to enclose the humidity sensor.

Manufacturing the hard disk drive may preferably include providing the humidity sensor and/or coupling the humidity sensor through the communicative coupling to the embedded circuit to create the hard disk drive. The hard disk drive is a product of this manufacturing process. The manufacturing may further include coupling the disk base to the disk cover to enclose the humidity sensor.

BRIEF DESCRIPTION OF THE DRAWINGS

FIGS. 1 to 5A shows aspects of the invention's hard disk drive including the humidity sensor;

DETAILED DESCRIPTION

Figure 1:
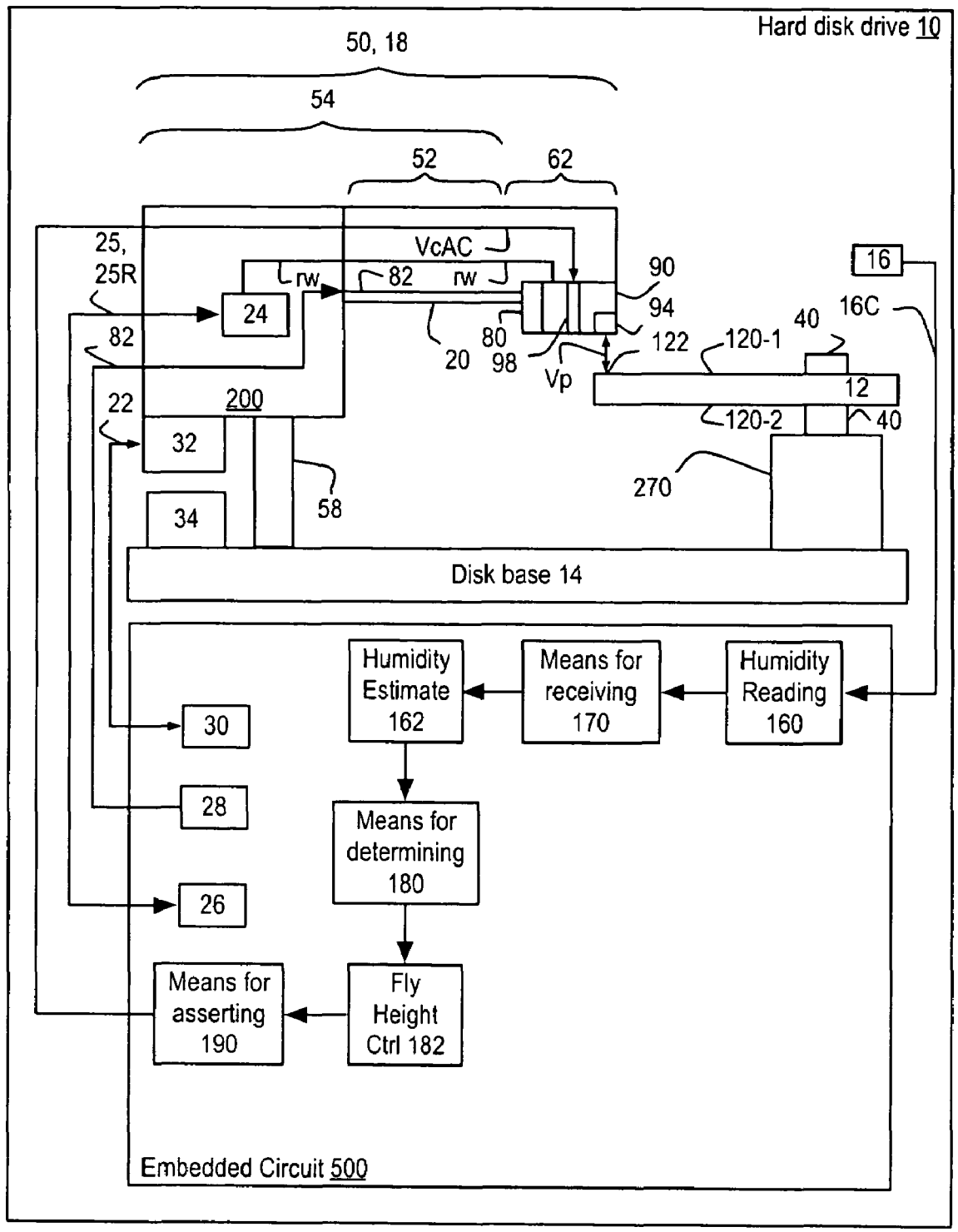

This invention relates to hard disk drives, in particular, to apparatus and methods for measuring humidity and adapting the operation of the hard disk drive based upon the humidity measurement.

The invention involves recognizing that the air gap between a slider 90 and the rotating disk surface 120-1 accessed by the slider tends to change in response to humidity changes within the hard disk drive 10. The inventors have experimentally found that even at moderate temperatures, for example forty five degrees Centigrade (° C.), if the relative humidity is high, say 90%, then enough water is present to reduce the magnetic spacing by more than one nanometer (nm), where the optimal flying height was under ten nm. In further experiments, a contemporary hard disk drive was modified to measure relative humidity and provide an estimate of the vertical position VP of the slider over the rotating disk surface. When the temperature was kept at 53° C. and the humidity changed from 6% to 64%, the vertical position of a slider changed by about 2 nm. The inventors in discovering this realized that including a humidity sensor 16 in a hard disk drive added the ability to compensate for humidity change, as shown in FIGS. 1 to 5A.

Preferably, the hard disk drive 10 includes the humidity sensor 16 communicatively coupled 16C to an embedded circuit 500 providing a humidity reading 160 used to control the vertical position VP of at least one slider 90 accessing a rotating disk surface 120-1. The invention operates as follows. The humidity reading is received 170 from the humidity sensor to create a humidity estimate 162. A flying height control 182 is determined 180 based upon the humidity estimate. The flying height control is asserted 190 to a vertical micro-actuator 98 coupled to the slider to alter the vertical position of the slider over the rotating disk surface.

The flying height control 182 may further be determined 180 based upon the track 122 the slider 90 is following on the rotating disk surface 120-1. The tracks of the rotating disk surface may preferably be organized into track groups of consecutive tracks, and the flying height control may preferably be determined based upon the track group the track belongs to.

Figure 2:
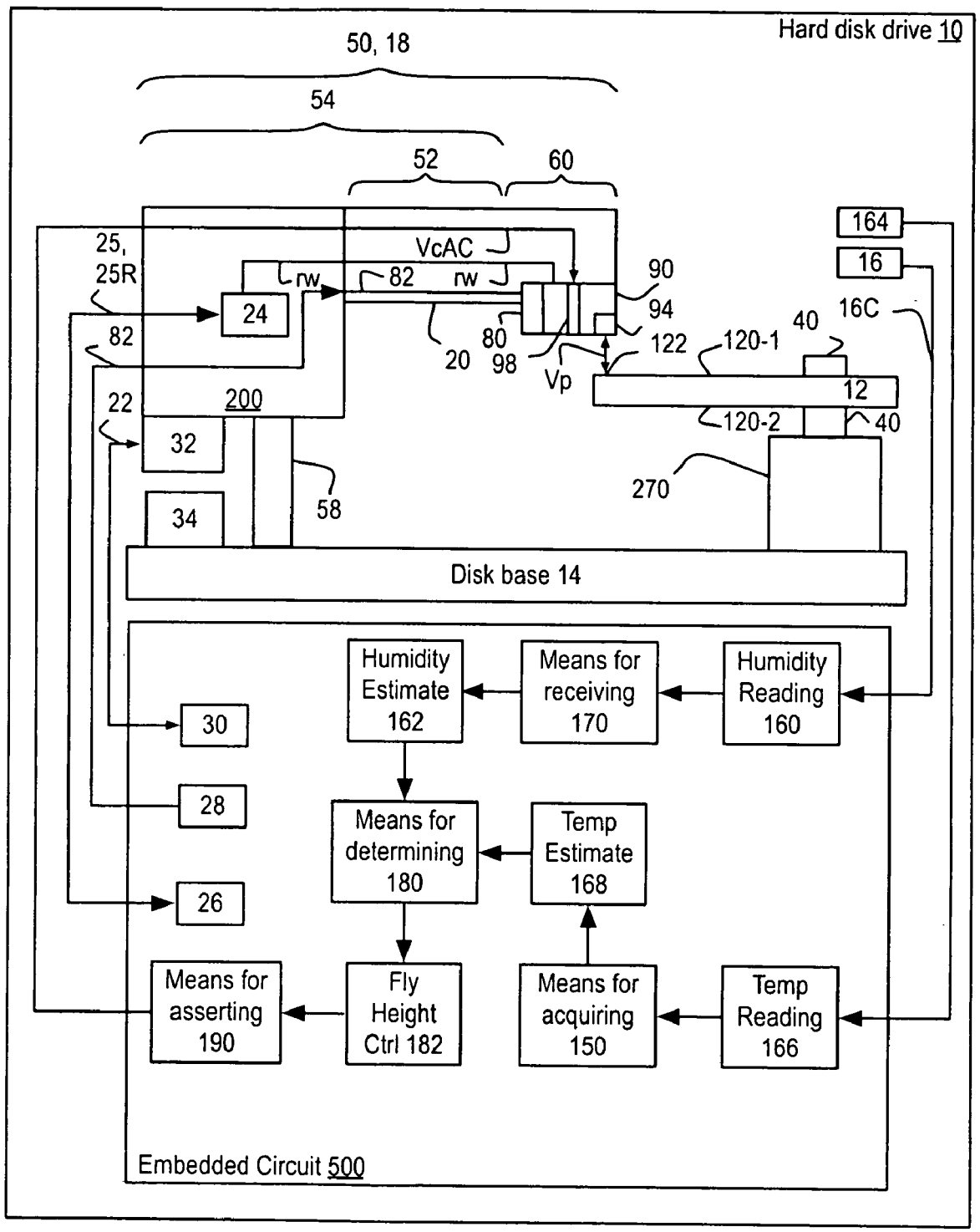
Figure 3:
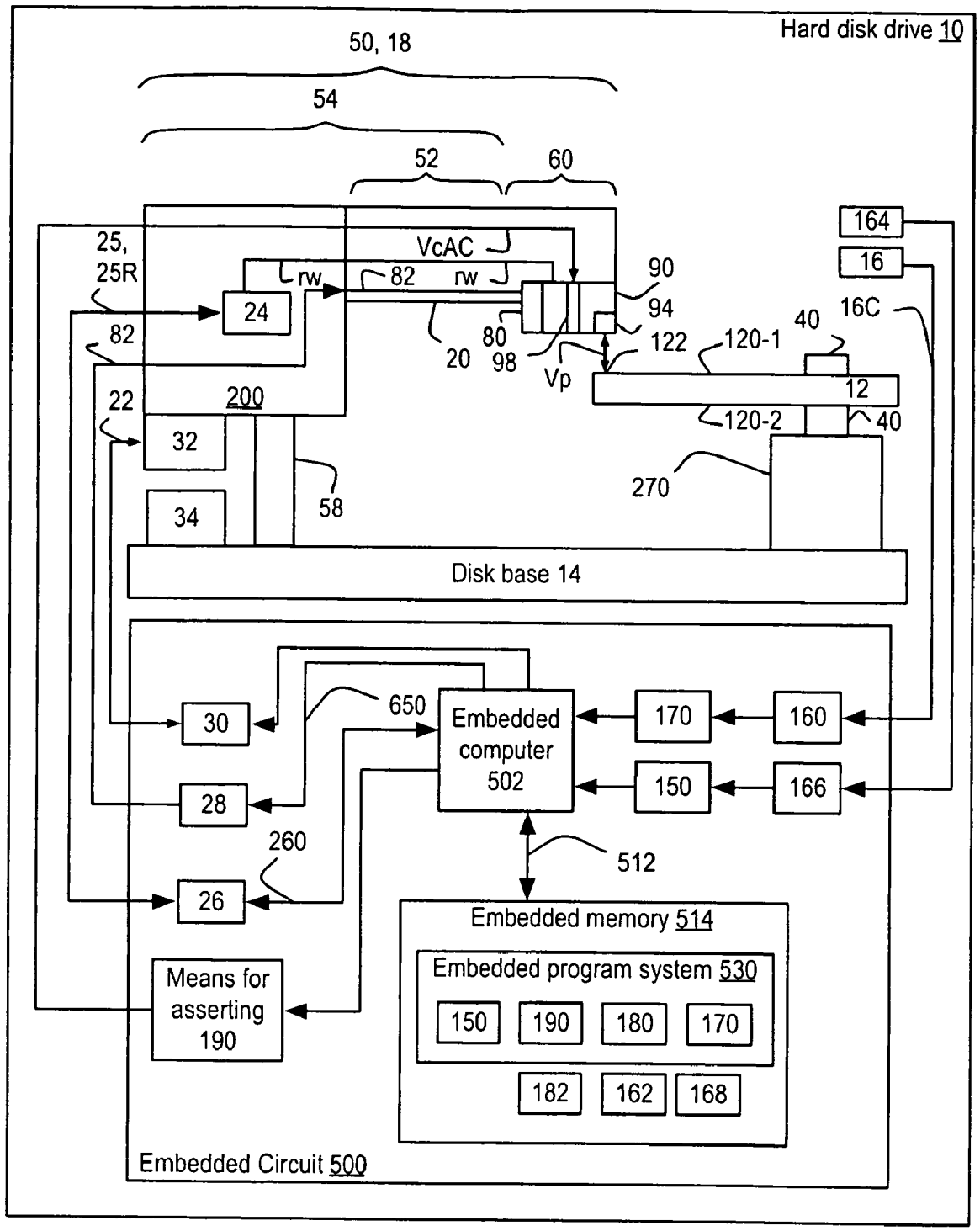
Figure 4:
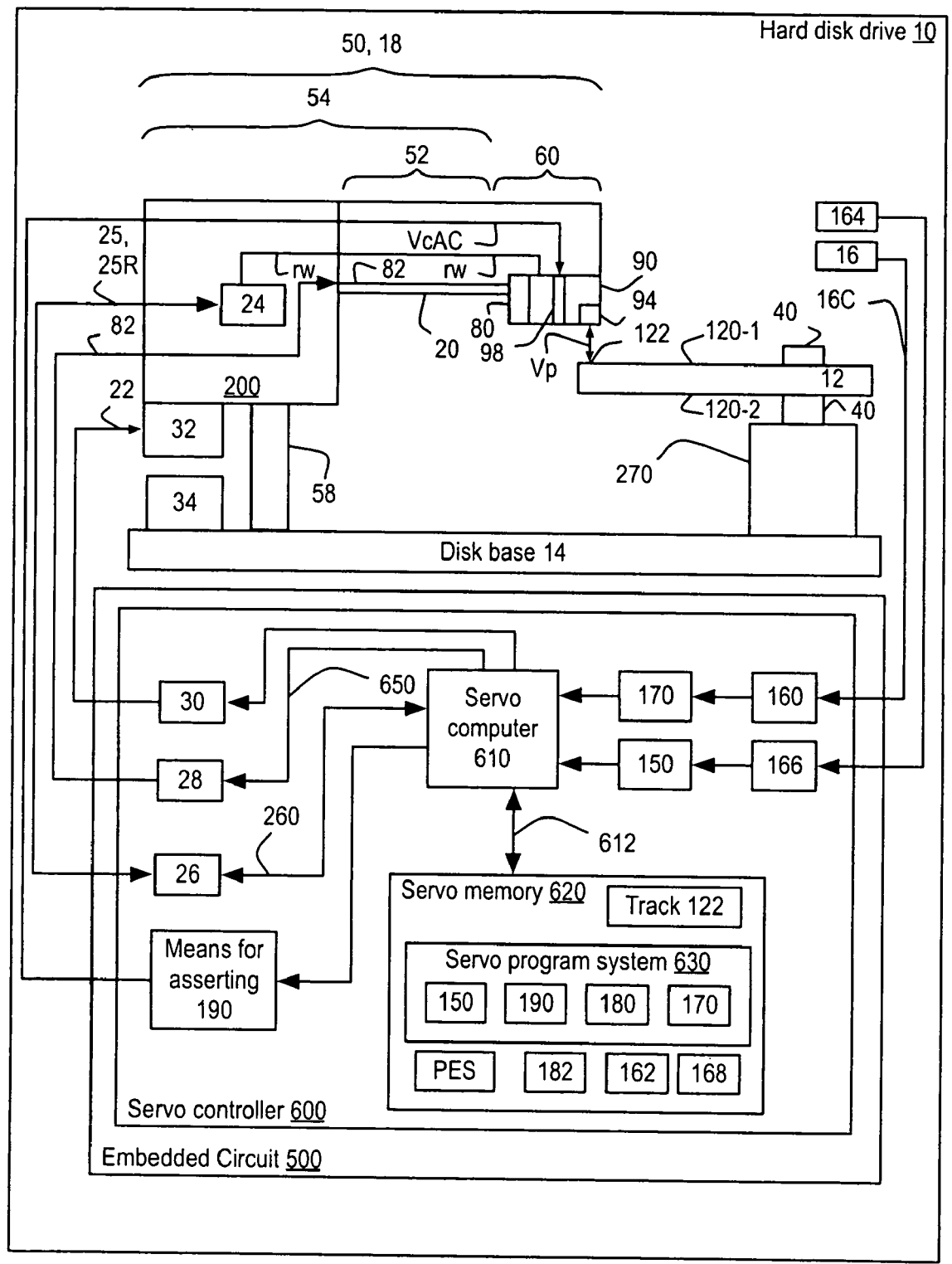

The flying height control 182 may further be determined 180 based upon the humidity estimate 162 and a temperature estimate 168 as shown in FIGS. 2 to 4. The temperature estimate may be used to predict changes in the media coercivity and other changes in the vertical position VP. By way of example, when the temperature estimate decreases at the same humidity estimate the flying height control may preferably be altered to lower the vertical position. The temperature estimate may be acquired 150 as a temperature reading 166 from a temperature sensor 164, as shown in FIGS. 2 to 4.

The embedded circuit 500 may support the invention's operations in the hard disk drive 10 by including the following. Means for receiving 170 the humidity reading 160 from the humidity sensor 16 to create the humidity estimate 162. Means for determining 180 the flying height control 182 based upon the humidity estimate. And means for asserting 190 the flying height control to the vertical micro-actuator 98 coupled to the slider 90 to alter the vertical position VP of the slider over the rotating disk surface 120-1. As used herein, the means group will refer to the means mentioned in this paragraph.

Figure 11A:
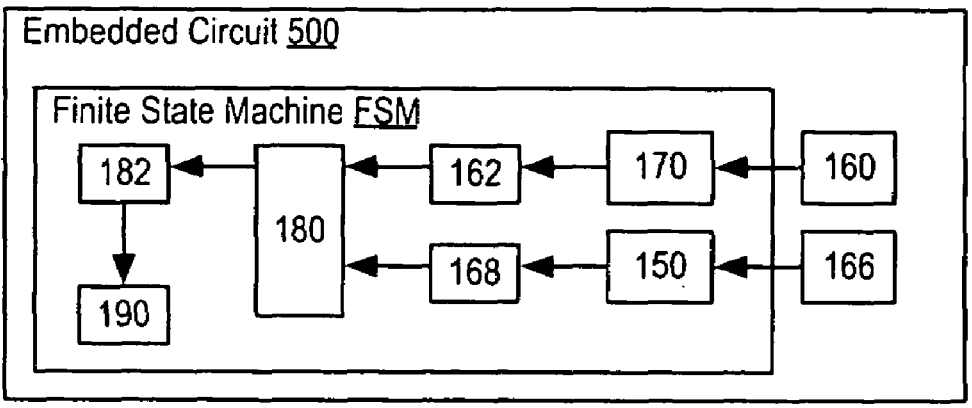
FIGS. 11A-11C show example embodiments of an embedded processor built in accord with the invention.
Figure 11B:
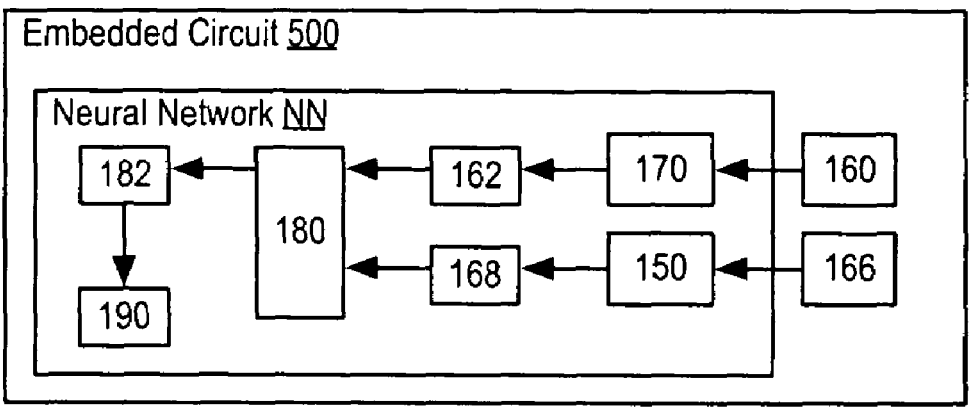
Figure 11C:
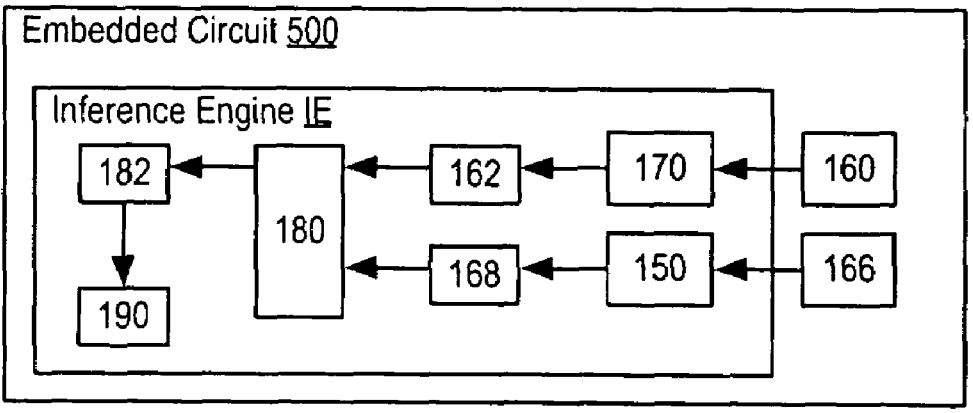

At least one member of the means group may preferably be at least partly implemented by at least one instance of at least one of the following. An embedded computer 502 embedded accessibly coupled 512 to an embedded memory 514 and directed by an embedded program system 530 including at least one program step residing in the embedded memory and implementing the member of the means group, as shown in FIG. 3. A servo computer 610 servo accessibly coupled 612 to a servo memory 620 and directed by a servo program system 630 including at least one program step residing in the servo memory and implementing the member of the means group, as shown in FIG. 4. A finite state machine FSM implementing the member of the means group, as shown in FIG. 11A. A neural network NN implementing the member of the means group, as shown in FIG. 11B. And an inference engine IE implementing the member of the means group, as shown in FIG. 11C.

Figure 10A:
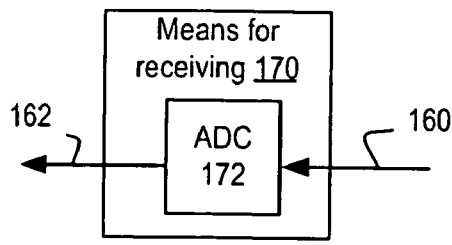
FIGS. 10A to 10C show further details of the means for receiving of FIGS. 1 to 4.
Figure 10B:
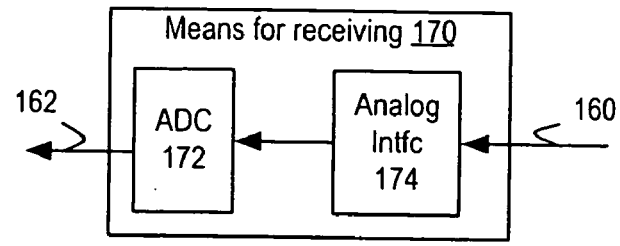
Figure 10C:
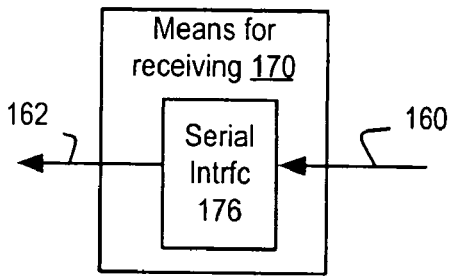

The means for receiving 170 may further include an analog to digital converter 172, an analog interface 174 to the analog to digital converter, and/or a serial interface 176 to the humidity sensor 16, each receiving the humidity reading 160 to create the humidity estimate 162 as shown in FIGS. 10A to 10C.

Figure 10D:
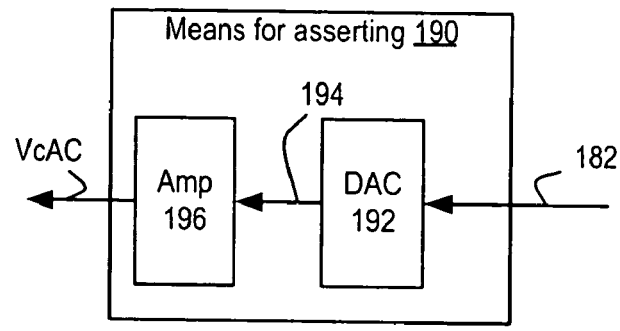
FIGS. 10D to 10F show further details of the means for asserting of FIGS. 1 to 4.
Figure 10E:
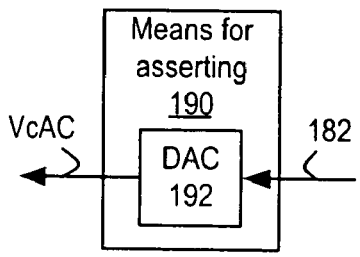
Figure 10F:
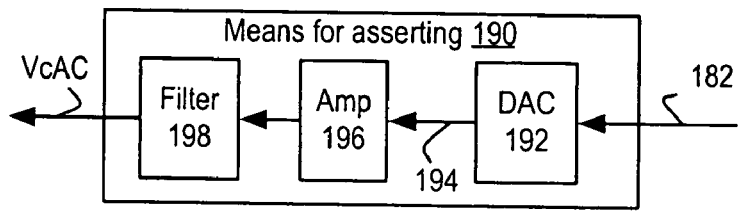
Figure 10G:
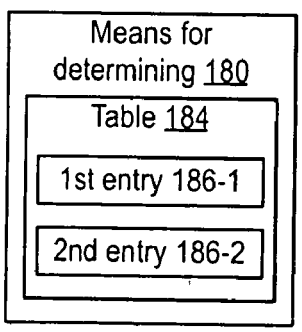
FIGS. 10G to 10I show further details of the means for determining of FIGS. 1 to 4.

The means for asserting 190 may further include a digital to analog converter 192 receiving the flying height control 182 to create a DAC output 194 used to at least partly create the vertical control signal VcAC, an amplifier 196 receiving the DAC output to create an amplified output used to further create the vertical control signal, and/or a filter 198 of at least one the DAC output and the amplified output to further create the vertical control signal as shown in FIGS. 10D to 10F.

Figure 10H:
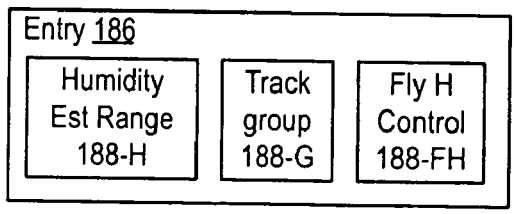

The means for determining 180 may preferably include a table 184 further preferably containing at least two entries, show in FIG. 11G as a first entry 186-1 and a second entry 186-2. By way of example, an entry 186 may include a humidity estimate range 188-H and a flying height control value 186-FH. The entry may further include a track group indication 188-G, as shown in FIG. 10H.

Determining 180 the flying height control may preferably include the following. When the track 122 being accessed belongs to the track group matching the track group indication and the humidity estimate matches the humidity estimate range, the flying height control value contributes to the flying height control 182.

Figure 10I:
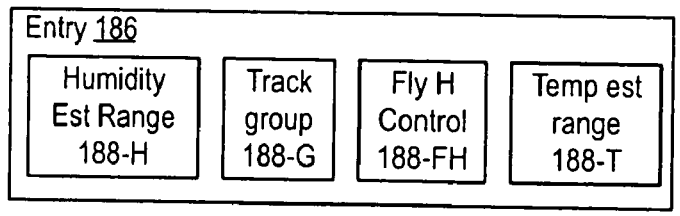

The entry 186 of the table 184 may further, preferably, include a temperature estimate range 188-T, as shown in FIG. 10I. Determining 180 the flying height control 182 may further preferably include the following. When the track 122 being accessed belongs to the track group matching the track group indication 188-G, the humidity estimate 162 matches the humidity estimate range 188-H, and the temperature estimate 168 belongs to the temperature estimate range, the flying height control value 186-FH contributes to the flying height control.

The flying height control value 186-FH may contribute to the flying height control 182 in any of at least the following ways: The flying height control may be set to the flying height control value. It may be additively offset by the flying height control value. Alternatively, it may be additively offset by flying height control value scaled by a linear combination of recent samples of the flying height control.

In certain embodiments, the embedded computer 502 directed by the embedded program system 530 may at least partly implement each member of the means group. The embedded program system may preferably include each of the following program steps as shown in FIG. 3. Receiving 170 the humidity reading 160 from the humidity sensor 16 to create the humidity estimate 162. Determining 180 the flying height control 182 based upon the humidity estimate. And asserting 190 the flying height control to the vertical micro-actuator 98 coupled to the slider 90 to alter the vertical position VP of the slider over the rotating disk surface 120-1.

Alternatively, the servo computer 610 directed by the servo program system 630 may implement each of the members of the means group as shown in FIG. 4. The servo program system may preferably include each of the program steps discussed for the embedded program system above.

Alternatively, the finite state machine FSM may at least partly implement each member of the means group as shown in FIG. 11A. The finite state machine may be implemented using an Application Specific Integrated Circuit (ASIC) and/or a Programmable Logic Device (PLD). As used herein, the ASIC may include a standard cell integrated circuit, a mixed signal integrated circuit and/or a gate array. The PLD may include a Field Programmable Gate Array, a Programmable Logic Array, or a network including one or more instances of these elements.

Alternatively, the neural network NN may at least partly implement each member of the means group as shown in FIG. 11B. The neural network may include a digital logic neural network and/or as an analog neural network.

Alternatively, the inferential engine IE may at least partly implement each member of the means group as shown in FIG. 11C. The inferential engine may include a fuzzy logic controller and/or an inference processor receiving the humidity reading to determine the flying height control through inference based upon the humidity reading.

Returning to FIGS. 1 to 4, the embedded circuit 500 may preferably be implemented with a printed circuit technology and/or an integrated circuit technology. The lateral control signal 82 may preferably be generated by a micro-actuator driver 28. The lateral control signal preferably includes the first lateral control signal and the second lateral control signal, as well as the AC lateral control signal. The lateral control signal may further include one or more second micro-actuator lateral control signals.

The voice coil driver 30 preferably stimulates the voice coil motor 18 through the voice coil 32 to provide coarse position of the slider 90, in particular, the read head 94-R or the write head near the track 122 on the disk surface 120-1. The read head is positioned for reading and the write head is positioned for writing.

The embedded circuit 500 may further process the read signal 25-R during the read access to the data 122 on the disk surface 120-1. The slider 90 may include an amplifier 96. The slider reports the amplified read signal as the result of a read access of the data on the disk surface. The flexure finger 20 may provide the read trace path for the amplified read signal as part of the read-write signal paths rw. The main flex circuit 200 may receive the amplified read signal from the read trace path to create the read signal as part of a read-write signal 25.

Manufacturing the embedded circuit 500 may preferably provide a communicative coupling 16C for the humidity sensor 16 to the embedded circuit to provide the humidity reading 160. The embedded circuit is a product of this manufacturing process. Manufacturing may further include programming the embedded program system 530, the servo program system 630, the finite state machine FSM, the neural network NN and/or the inferential engine IE to at least partly implement the operations of the invention. Programming the embedded program system may preferably include programming a non-volatile memory component of the embedded memory 514. Similarly, programming the servo program system may preferably include programming a non-volatile memory component of the servo memory 620.

The humidity sensor 16 may preferably measure at least one of the properties of a resistance, a capacitive and/or a thermal conductance. These measures are taken for materials possessing the property as a function of water pressure. The disk base 14 and the disk cover 17 may preferably enclose the humidity sensor.

Figure 8A:
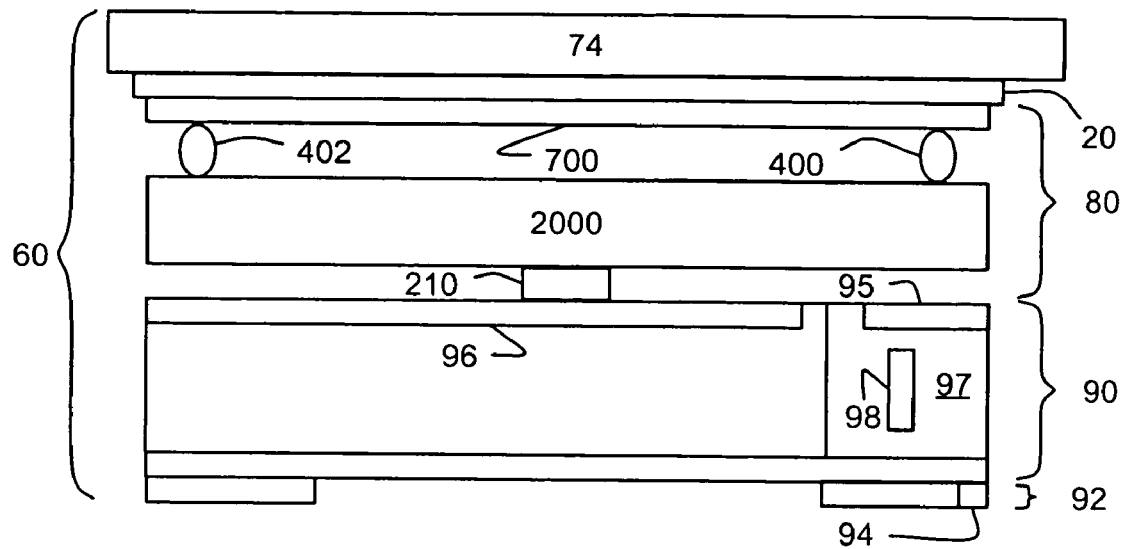
FIGS. 8A and 8B show a micro-actuator assembly employing an electrostatic effect.
Figure 8B:
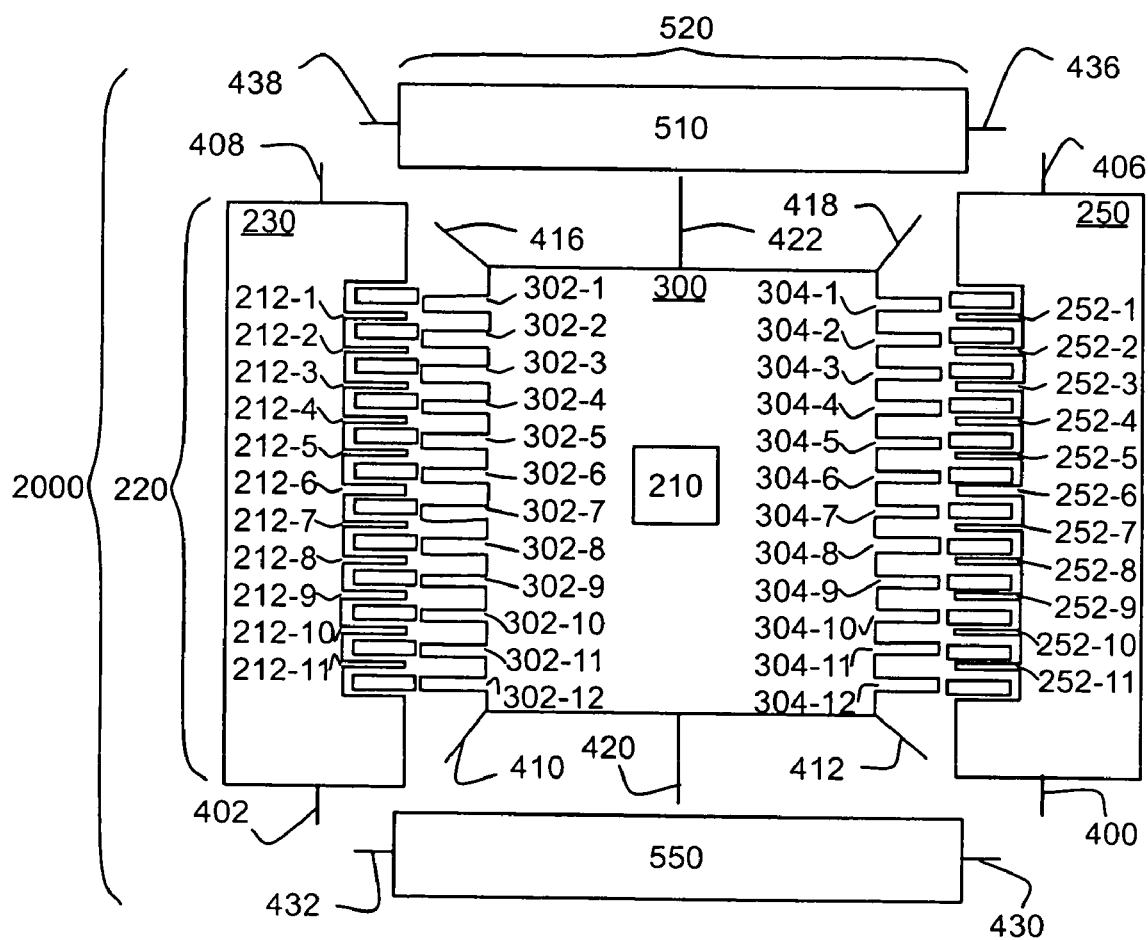
Figure 9A:
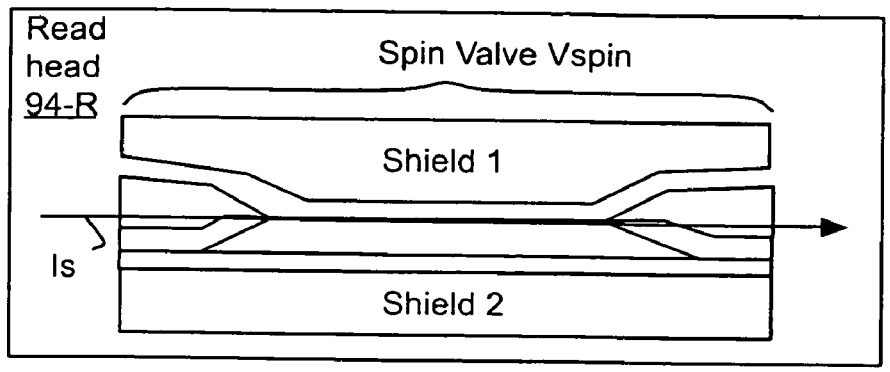
FIG. 9A shows the read head of the slider including a spin valve.
Figure 9B:
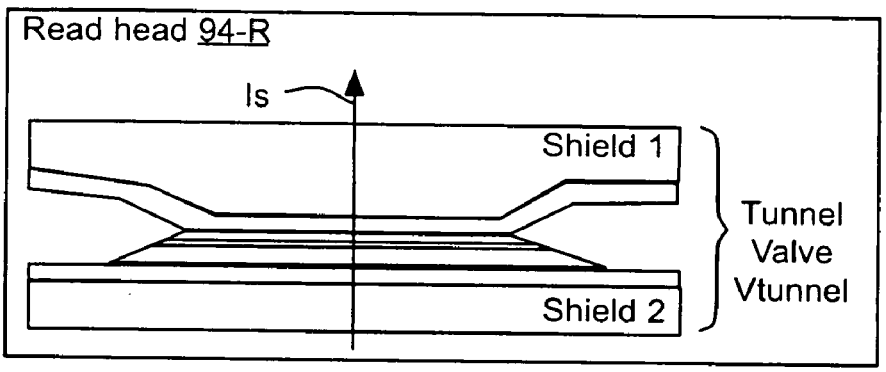
FIG. 9B shows the read head of the slider including a tunneling valve.
Figure 9C:
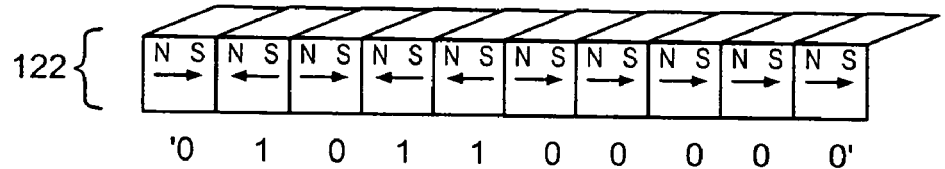
FIG. 9C shows the magnetic polarizations of bits in a track which are parallel the disk surface.
Figure 9D:
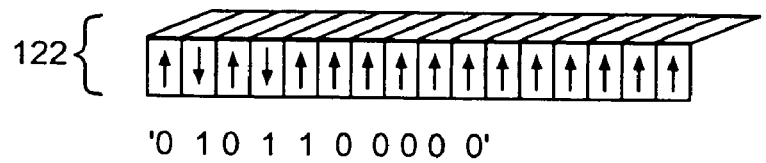
FIG. 9D shows the magnetic polarizations of bits in a track which are perpendicular the disk surface.

Returning to the hard disk drive 10, the vertical micro-actuator may include a vertical micro-actuator element 98 embedded in the slider 90 and/or a micro-actuator assembly 80 coupled to the slider. The micro-actuator assembly may employ a piezoelectric effect as shown in FIG. 5B and/or an electrostatic effect as shown in FIGS. 8A and 8B. The slider may include a spin valve as shown in FIG. 9A or a tunnel valve as shown in FIG. 9B. The track 122 of FIGS. 1 to 4 may include represent bits by magnetic polarizations parallel to the disk surface 120-1 as shown in FIG. 9C or perpendicular to the disk surface as shown in FIG. 9D.

In further detail, the head gimbal assembly 60 may preferably include a micro-actuator assembly 80, which may employ at least one of the following: a piezoelectric effect and/or an electrostatic effect.

The slider 90, and its read-write head 94 may include a read head 94-R using a spin valve to read the data on the disk surface 120-1, or use a tunneling valve to read the data. The slider may include a vertical micro-actuator 98 for altering the vertical position Vp of the read-write head above the disk surface. The slider may further include the read head providing a read differential signal pair to an amplifier 96 to generate an amplified read signal reported by the slider as a result of the read access of the data on the disk surface. The amplifier may be opposite the air bearing surface 92, and may be separate from the deformation region 97, and may further be separate from the vertical micro-actuator 98.

The slider 90 may include a vertical micro-actuator 98, coupled to a deformation region 97 including a read-write head 94 and stimulated by a vertical control signal VcAC providing a potential difference with a first slider power terminal, possibly by heating the deformation region to alter the vertical position Vp of the read-write head over the disk surface 120-1 in a hard disk drive 10 as shown in FIG. 8A. the slider may further include a heat sink 95 which may preferably minimize the probability of the slider overheating from the operation of the vertical micro-actuator.

The slider 90 is used to access the data 122 on the disk surface 120-1 in a hard disk drive 10. The data is typically organized in units known as a track 122, which are usually arranged in concentric circles on the disk surface centered about a spindle shaft 40 and alternatively may be organized as joined spiral tracks. Operating the slider to read access the data on the disk surface includes the read head 94-R driving the read differential signal pair to read access the data on the disk surface. The read-write head 94 is formed perpendicular to the air bearing surface 92.

The read head 94-R may use a spin valve to drive the read differential signal pair as shown in FIG. 9A. As used herein, the spin valve employs a magneto-resistive effect to create an induced sensing current Is between the first shield Shield1 and the second shield Shield2. Spin valves have been in use the since the mid 1990's.

The read head 94-R may use a tunnel valve to drive the read differential signal pair as shown in FIG. 9B. As used herein, a tunnel valve uses a tunneling effect to modulate the sensing current Is perpendicular to the first shield Shield1 and the second shield Shield2. Both longitudinally recorded signals as shown in FIG. 9C and perpendicularly recorded signals shown in FIG. 9D can be read by either reader type. Perpendicular versus longitudinal recording relates to the technology of the writer/media pair, not just the reader.

The tunnel valve is used as follows. A pinned magnetic layer is separated from a free ferromagnetic layer by an insulator, and is coupled to a pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the disk surface 120-1, results in a change of electrical resistance through the tunnel valve.

The flexure finger 20 for the slider 90 of FIGS. 1 to 6, preferably contains a micro-actuator assembly 80 for mechanically coupling to the slider to aid in positioning the slider to access the data 122 on 120-1 disk surface of the disk 12. The micro-actuator assembly may aid in laterally positioning LP the slider to the disk surface as shown in and/or aid in vertically positioning VP the slider. The flexure finger 20 may further provide the vertical control signal VcAC and preferably the first lateral control signal as the first slider power terminal to the vertical micro-actuator.

The flexure finger 20 preferably includes the lateral control signal 82 and trace paths between the slider for the write differential signal pair. The lateral control signal preferably includes the first lateral control signal and the second lateral control signal, as well as the AC lateral control signal. When the slider does not contain an amplifier 96, the flexure finger further preferably provides trace paths for the read differential signal pair.

The micro-actuator assembly 80 may employ a piezoelectric effect and/or an electrostatic effect to aid in positioning the slider 90. First, examples of micro-actuator assemblies employing the piezoelectric effect will be discussed followed by electrostatic effect examples. In several embodiments of the invention the micro-actuator assembly may preferably couple with the head gimbal assembly 60 through the flexure finger 20, as shown in FIG. 5B. The micro-actuator assembly may further couple through the flexure finger to a load beam 74 to the head gimbal assembly and consequently to the head stack assembly 50.

Examples of micro-actuator assemblies employing the piezoelectric effect are shown in FIG. 5B, which shows a side view of a head gimbal assembly with a micro-actuator assembly 80 including at least one piezoelectric element PZ1 for aiding in laterally positioning LP of the slider 90. In certain embodiments, the micro-actuator assembly may consist of one piezoelectric element. The micro-actuator assembly may include the first piezoelectric element and a second piezoelectric element, both of which may preferably aid in laterally positioning the slider. In certain embodiments, the micro-actuator assembly may be coupled with the slider with a third piezoelectric element to aid in the vertically positioning the slider above the disk surface 120-1.

Examples of the invention using micro-actuator assemblies employing the electrostatic effect are shown in FIGS. 8A and 8B derived from the Figures of U.S. patent application Ser. No. 10/986,345, which is incorporated herein by reference. FIG. 8A shows a schematic side view of the micro-actuator assembly 80 coupling to the flexure finger 20 via a micro-actuator mounting plate 700. FIG. 8B shows the micro-actuator assembly using an electrostatic micro-actuator assembly 2000 including a first electrostatic micro-actuator 220 to aid the laterally positioning LP of the slider 90. The electrostatic micro-actuator assembly may further include a second electrostatic micro-actuator 520 to aid in the vertically positioning VP of the slider.

The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the write differential signal pair and either the read differential signal pair or the amplified read signal of the read-write head 94 of the slider 90.

The bonding block 210 may electrically couple the read-write head 90 to the amplified read signal and write differential signal pair, and mechanically couples the central movable section 300 to the slider 90 with read-write head 94 embedded on or near the air bearing surface 92 included in the slider.

The first micro-actuator 220 aids in laterally positioning LP the slider 90, which can be finely controlled to position the read-write head 94 over a small number of tracks 122 on the disk surface 120-1. This lateral motion is a first mechanical degree of freedom, which results from the first stator 230 and the second stator 250 electrostatically interacting with the central movable section 300. The first micro-actuator 220 may act as a lateral comb drive or a transverse comb drive, as is discussed in detail in the incorporated United States Patent Application.

The electrostatic micro-actuator assembly 2000 may further include a second micro-actuator 520 including a third stator 510 and a fourth stator 550. Both the third and the fourth stator electrostatically interact with the central movable section 300. These interactions urge the slider 90 to move in a second mechanical degree of freedom, aiding in the vertically positioning VP to provide flying height control. The second micro-actuator may act as a vertical comb drive or a torsional drive, as is discussed in detail in the incorporated United States Patent Application. The second micro-actuator may also provide motion sensing, which may indicate collision with the disk surface 120-1 being accessed.

The central movable section 300 not only positions the read-write head 10, but may act as the conduit for the write differential signal pair and in certain embodiments, the first slider power signal and the second slider power signal, as well as the read differential signal pair or the amplified read signal. The electrical stimulus of the first micro-actuator 220 is provided through some of its springs.

The central movable section 300 may preferably to be at ground potential, and so does not need wires. The read differential signal pair, the amplified read signal, the write differential signal pair and/or the slider power signals and traces may preferably be routed with flexible traces all the way to the load beam 74 as shown in FIG. 8A.

The flexure finger 20 may further provide a read trace path rtp for the amplified read signal. The slider 90 may further include a first slider power terminal and a second slider power terminal, both electrically coupled to the amplifier 96 to collectively provide power to generate the amplified read signal. The flexure finger may further include a first power path electrically coupled to the first slider power terminal and/or a second power path electrically coupled to the second slider power terminal, which are collectively used to provide electrical power to generate the amplified read signal.

The hard disk drive 10 preferably includes the disk base 14 coupled to the disk cover 17 to enclose the humidity sensor 16.

Manufacturing the hard disk drive 10 may preferably include providing the humidity sensor 16 and/or coupling the humidity sensor through a communicative coupling 16C to the embedded circuit 500 to create the hard disk drive. The hard disk drive is a product of this manufacturing process. The manufacturing may further include coupling the disk base 14 to the disk cover 17 to enclose the humidity sensor.

In further detail, the head gimbal assembly 60 may further provide the vertical control signal VcAC to the heating element of the vertical micro-actuator 98, as shown in FIGS. 1 to 4 and 6. Operating the head gimbal assembly may further preferably include driving the vertical control signal. The flexure finger 20 may be coupled to the load beam 74 as shown in FIG. 8.

The head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly.

Figure 5A:
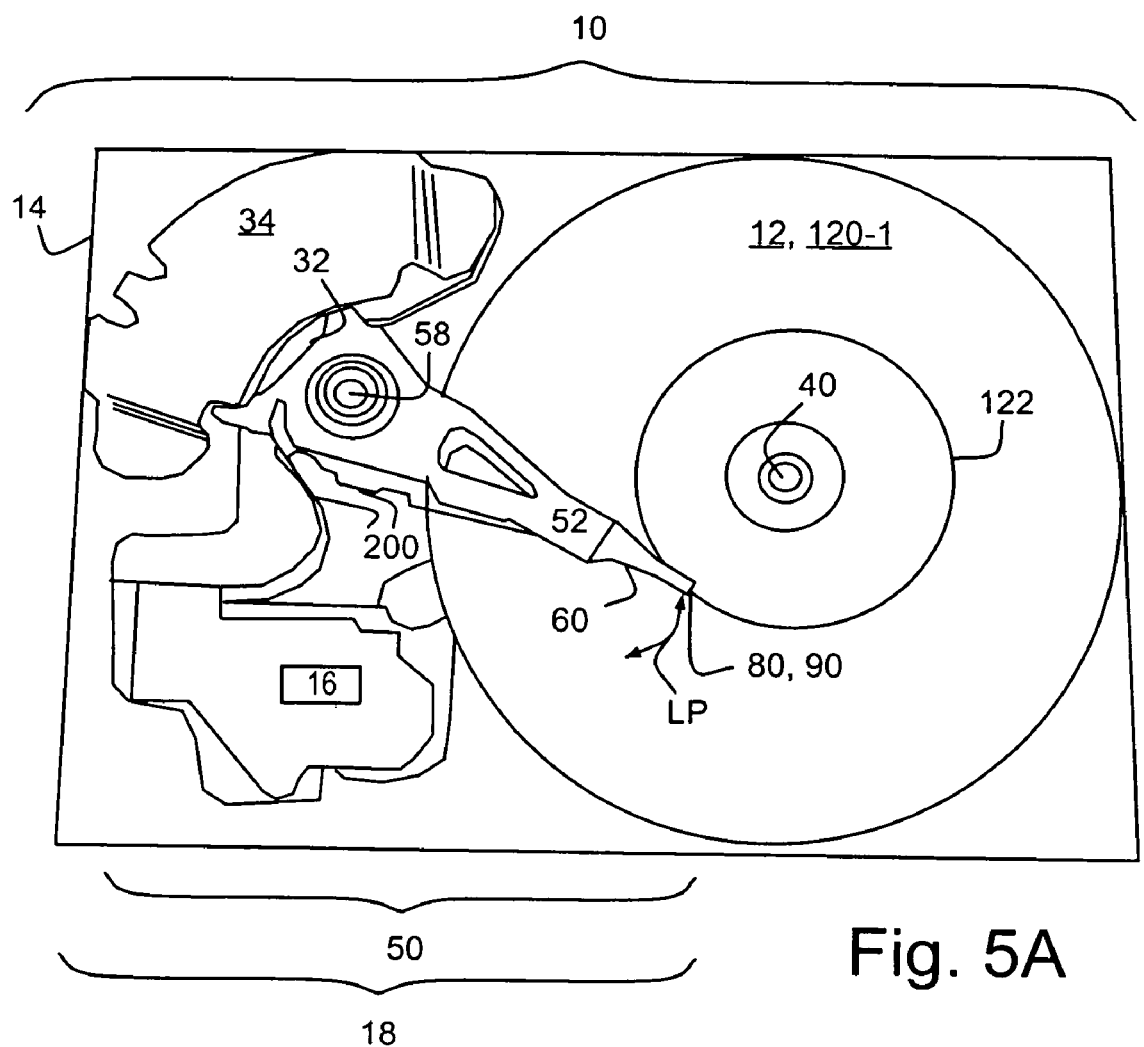
Figure 5B:
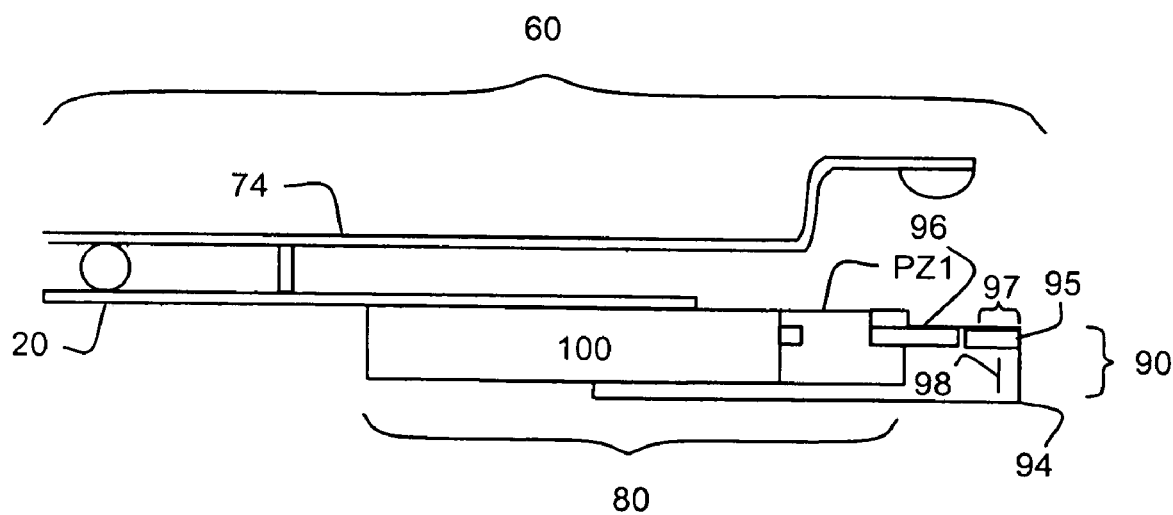
FIG. 5B shows an embodiment of the head gimbal assembly including a micro-actuator assembly employing a piezoelectric effect.
Figure 6:
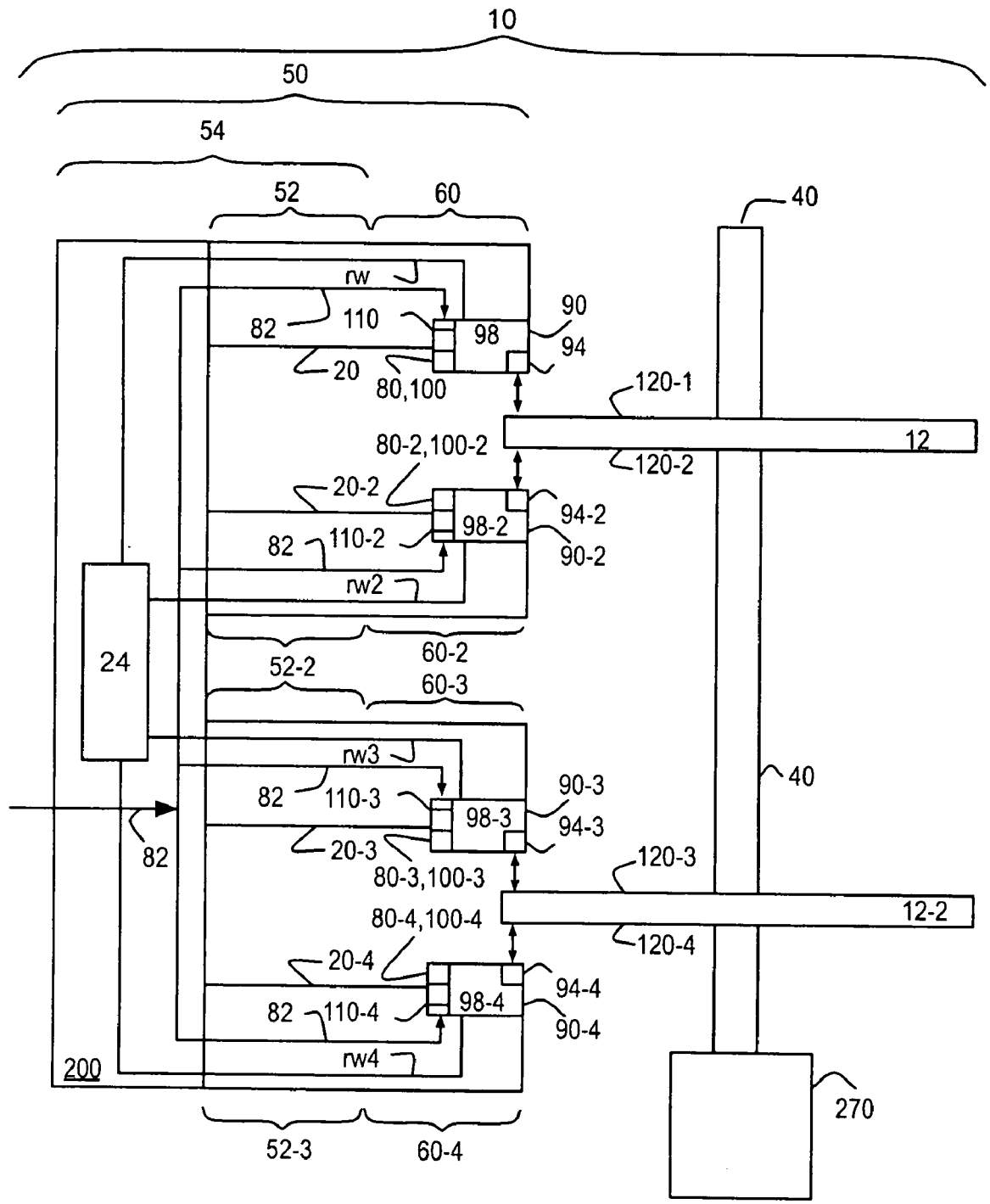
FIG. 6 shows an example of the hard disk drive including more than disk and more than one disk surfaces per disk can be accessed.
Figure 7:
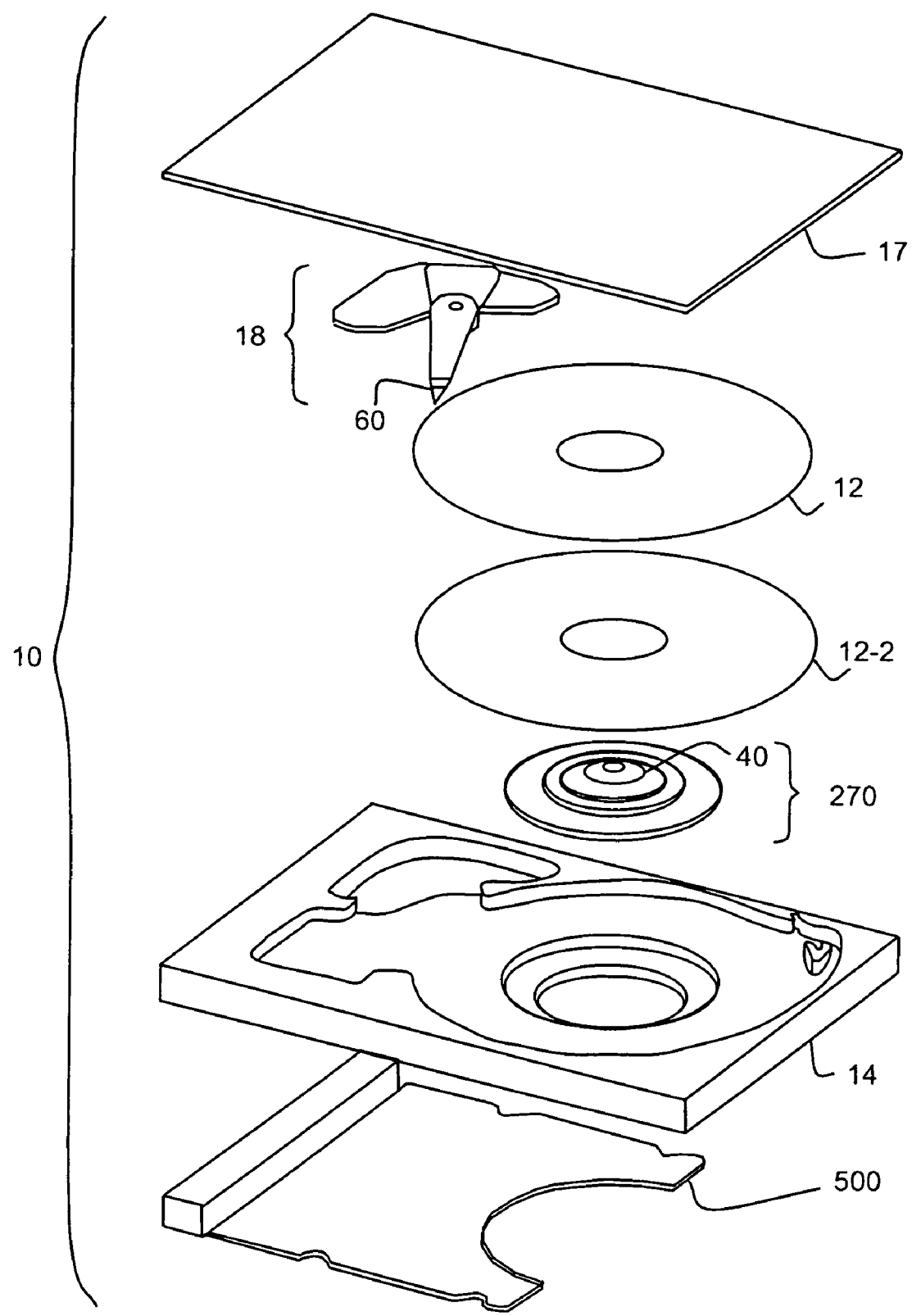
FIG. 7 shows an exploded view of several of the components of the invention's hard disk drive.

The head stack assembly 50 includes at least one head gimbal assembly 60 coupled to a head stack 54, as shown in FIGS. 5A and 6.

The head stack assembly 50 may include more than one head gimbal assembly 60 coupled to the head stack 54. By way of example, FIG. 6 shows the head stack assembly coupled with a second head gimbal assembly 60-2, a third head gimbal assembly 60-3 and a fourth head gimbal assembly 60-4. Further, the head stack, as also shown in FIGS. 1 to 4 and 5A, includes the actuator arm 52 coupling to the head gimbal assembly. In FIG. 6, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 60-4. The second head gimbal assembly includes the second slider 90-2, which contains the second read-write head 94-2. The third head gimbal assembly includes the third slider 90-3, which contains the third read-write head 94-3. And the fourth head gimbal assembly includes a fourth slider 90-4, which contains the fourth read-write head 94-4.

The hard disk drive 10 may further use a second disk surface 120-2 of the disk 12. The hard disk drive may include more than one disk, for example, a second disk 12-2 and use a third disk surface 120-3 and a fourth disk surface 120-4.

In certain embodiments, the head stack assembly 50 preferably operates as follows: for each of the sliders 90 included in each of the head gimbal assemblies 60 of the head stack, when the temperature of the shape memory alloy film in the vertical micro-actuator 98 of the slider is below a first temperature, the film configures in a first solid phase to the deformation region 97 to create the vertical position VP of that read-write head above its disk surface. Whenever the temperature of the film of the shape memory alloy is above the first temperature, the film configures in a second solid phase to the deformation region increasing the vertical position of the read-write head above the disk surface.

In further detail, the hard disk drive 10, shown in FIGS. 1 to 5A, 6, and 7, includes the head stack assembly 50 pivotably mounted through the actuator pivot 58 on a disk base 14 and arranged for the slider 90 of the head gimbal assembly 60 to be laterally positioned LP near the data 122 for the read-write head 94 to access the data on the disk surface 120-1. The disk 12 is rotatably coupled to the spindle motor 270 by the spindle shaft 40. The head stack assembly is electrically coupled to the embedded circuit 500.

In further detail, manufacturing the hard disk drive 10 may include pivotably mounting the head stack assembly 50 by an actuator pivot 58 to the disk base 14 and arranging the head stack assembly, voice coil 32 and fixed magnet(s) 34, the disk 12, and the spindle motor 270 for the slider 90 of the head gimbal assembly 60 to access the data 122 on the disk surface 120-1 of the disk 12 rotatably coupled to the spindle motor, to at least partly create the hard disk drive. The invention includes this manufacturing process and the hard disk drive as a product of that process.

The voice coil motor 18 is often considered to include the head stack assembly 50 coupling with the voice coil 32 to interact with the fixed magnet(s) 34, which rotating about the actuator pivot 58 above the disk base 14.

Manufacturing the hard disk drive 10 may further include electrically coupling the head stack assembly 50 to the embedded circuit 500 to provide the read signal 25-R as the result of the read access of the data 122 on the disk surface 120-1. It may further include coupling the servo controller 600 and/or the embedded circuit 500 to the voice coil motor 18 and providing the micro-actuator stimulus signal 650 to drive the micro-actuator assembly 80. And electrically coupling the vertical control driver of the embedded circuit to the vertical control signal VcAC of the slider 90 through the head stack assembly 50, in particular through the flexure finger 20.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the hard disk drive 10 operates as follows when accessing the data 122 on the disk surface 120-1. The spindle motor 270 is directed by the embedded circuit 500, often the servo-controller 600, to rotate the disk 12, rotating the disk surface for access by the read-write head 94. The embedded circuit, in particular, the servo controller drives the voice coil driver 30 to create the voice coil control signal 22, which stimulates the voice coil 32 with an alternating current electrical signal, inducing a time-varying electromagnetic field, which interacts with the fixed magnet 34 to move the voice coil parallel the disk base 14 through the actuator pivot 58, which alters the lateral position LP of the read-write head of the slider 90 in the head gimbal assembly 60 coupled to the actuator arm 52, which is rigidly coupled to the head stack 54 pivoting about the actuator pivot. Typically, the hard disk drive first enters track seek mode, to coarsely position the read-write head near the data, which as stated above, is typically organized as a track. Once the read-write head is close to the track, track following mode is entered. Often this entails additional positioning control provided by the micro-actuator assembly 80 stimulated by the lateral control signal 82, which is driven by the micro-actuator driver 28. In certain embodiments of the hard disk drive supporting triple stage actuation, the second micro-actuator 80A may be further stimulated by one or more second micro-actuator lateral control signals 82A. Reading the track may also include generating a Position Error Signal 260, which is used by the servo controller as positioning feedback during track following mode.

The preceding embodiments provide examples of the invention and are not meant to constrain the scope of the following claims.

What is claimed is:

1. A hard disk drive, comprising: a humidity sensor communicatively coupled to an embedded circuit to provide a humidity reading used to control the vertical position of at least one slider accessing a rotating disk surface.

2. A method of operating a hard disk drive, comprising the steps:
   receiving by an embedded circuit a humidity reading from a humidity sensor to create a humidity estimate;
   determining by said embedded circuit a flying height control based upon said humidity estimate; and
   asserting by said embedded circuit said flying height control to a vertical micro-actuator coupled to said slider to alter said vertical position of said slider over said rotating disk surface.

3. The method of claim 2,
   further comprises the step:
   acquiring by said embedded circuit a temperature reading from a temperature sensor included in said hard disk drive to create a temperature estimate; and
   wherein the step determining by said embedded circuit said flying height control, further comprises the step:
   determining by said embedded circuit a flying height control based upon said humidity estimate and said temperature estimate.

4. An embedded circuit for use in a hard disk drive, comprising:

means for receiving a humidity reading from a humidity sensor to create a humidity estimate;

means for determining a flying height control based upon said humidity estimate; and means for asserting said flying height control to a vertical micro-actuator coupled to a slider to alter said vertical position of said slider over said rotating disk surface.

5. The embedded circuit of claim 4, wherein at least one member of a means group, is at least partly implemented by at least one instance of a member of the group consisting of:

an embedded computer accessibly coupled to an embedded memory and directed by an embedded program system including at least one program step residing in said embedded memory and at least partly implementing said member of said means group;

a servo computer accessibly coupled to a servo memory and directed by a servo program system including at least one program step residing in said servo memory and at least partly implementing said member of said means group;

a finite state machine at least partly implementing said member of said means group;

a neural network at least partly implementing said member of said means group; and an inference engine at least partly implementing said member of said means group; and wherein said means group consists of the members: said means for receiving; said means for determining; and said means for asserting.

6. The embedded circuit of claim 5, wherein said embedded computer directed by said embedded program system at least partly implements each of said members of said means group.

7. The embedded circuit of claim 6, wherein said embedded program system comprises the program steps:

receiving said humidity reading from said humidity sensor to create said humidity estimate;

determining said flying height control based upon said humidity estimate; and asserting said flying height control to said vertical micro-actuator coupled to said slider to alter said vertical position of said slider over said rotating disk surface.

8. The embedded circuit of claim 5, wherein said servo computer directed by said servo program system implements each of said members of said means group.

9. The embedded circuit of claim 8, wherein said servo program system comprises the program steps:

receiving said humidity reading from said humidity sensor to create said humidity estimate;

determining said flying height control based upon said humidity estimate; and asserting said flying height control to said vertical micro-actuator coupled to said slider to alter said vertical position of said slider over said rotating disk surface.

10. The embedded circuit of claim 5, wherein said finite state machine at least partly implements each of said members of said means group.

11. The embedded circuit of claim 5, wherein said neural network at least partly implements each of said members of said means group.

12. The embedded circuit of claim 5, wherein said inferential engine at least partly implements each of said members of said means group.

13. A method of manufacturing said embedded circuit of claim 4, comprising the step:

providing a communicative coupling for said embedded circuit to receive said humidity reading from said humidity sensor.

14. The embedded circuit as a product of the process of claim 13.

15. A hard disk drive, comprising:

a humidity sensor communicatively coupled to an embedded circuit to provide a humidity reading used to control the vertical position of at least one slider accessing a rotating disk surface, whereby said embedded circuit receives said humidity reading from said humidity sensor to create said humidity reading, said embedded circuit determines a flying height control based upon said humidity estimate, and said embedded circuit asserts a flying height control to a vertical micro-actuator coupled to said slider to alter said vertical position of said slider over said rotating disk surface.

16. The hard disk drive of claim, 15 wherein said vertical micro-actuator includes at least one member of the group consisting of:

a vertical micro-actuator element embedded in said slider; and a micro-actuator assembly coupled to said slider.

17. The hard disk drive of claim 16, wherein said micro-actuator assembly employs at least one member of the group consisting of: a piezoelectric effect and an electrostatic effect.

18. The hard disk drive of claim 15, wherein said slider includes a member of the group consisting of: a spin valve and a tunnel valve.

19. The hard disk drive of claim 15, wherein said humidity sensor measures at least one measurable property of a material included in said humidity sensor;

wherein said measurable property is a member of the group consisting of a measurable electrical resistance, a measurable electrical capacitance, and a measurable thermal conductance.

20. The hard disk drive of claim 15, further comprising: a disk base coupled to a disk cover to enclose said humidity sensor.

21. A method of manufacturing said hard disk drive of claim 20, comprising the step:

coupling said disk base to said disk cover to enclose said humidity sensor.

22. The hard disk drive as a product of the process of claim 21.

23. A method of manufacturing said hard disk drive of claim 15, comprising at least one member of the group consisting of the steps:

providing said humidity sensor to at least partly create humidity sensor included in said hard disk drive; and coupling said humidity sensor through said communicative coupling to said embedded circuit to create said hard disk drive.

24. The hard disk drive as a product of the process of claim 23.

* * * * *